United States Patent [19]

Offringa et al.

[11] Patent Number: 4,675,965
[45] Date of Patent: Jun. 30, 1987

[54] METHOD FOR MANUFACTURING A PIPE PART FROM FIBRE-REINFORCED THERMOSETTING SYNTHETIC MATERIAL

[75] Inventors: Oege R. Offringa, Hardenberg; Frederik Van Der Ploeg, Dalfsen, both of Netherlands

[73] Assignee: Wavin B.V., Zwolle, Netherlands

[21] Appl. No.: 811,422

[22] Filed: Dec. 20, 1985

[30] Foreign Application Priority Data

Dec. 28, 1984 [NL] Netherlands .................... 8403969

[51] Int. Cl.[4] ................. B21D 53/00; B65H 81/00
[52] U.S. Cl. ........................... 29/157 T; 29/527.2; 156/173; 156/304.2; 264/137; 285/156; 285/293; 285/423
[58] Field of Search ............. 29/157 T, 157 R, 527.2; 156/173, 175, 182, 183, 304.2, 446; 264/136, 137; 285/156, 423, 293

[56] References Cited

U.S. PATENT DOCUMENTS

| 2,751,237 | 6/1956 | Conley | 156/191 X |
| 3,765,979 | 10/1973 | Thomas | 156/173 |
| 4,106,797 | 8/1978 | Michael | 29/157 T |
| 4,504,086 | 3/1985 | Carrow | 156/187 X |
| 4,601,770 | 7/1986 | Ulrich et al. | 156/173 X |

FOREIGN PATENT DOCUMENTS 146871 11/1979 Japan .................... 29/157 T

Primary Examiner—Howard N. Goldberg
Assistant Examiner—Ronald S. Wallace
Attorney, Agent, or Firm—Wilkinson, Mawhinney & Theibault

[57] ABSTRACT

In the manufacture of a pipe part from fibre-reinforced thermosetting resin, such as a T-piece, preformed pipe parts made of fibre-reinforced thermosetting resin are placed on a mandrel defining the inside shape of the pipe part, the external surface of the mandrel being partially covered. The space between the mandrel and the inside of the pre-formed pipe parts is sealed and the parts of the pre-formed pipe parts adjacent to the uncovered part of the mandrel are chamfered on the outside. Synthetic resin impregnated fibres are then applied to the uncovered part of the mandrel and to at least the chamfered parts of the preformed pipe parts placed on the mandrel, until the pipe part has reached the desired final shape, after which it is cured and the mandrel is removed from the finished pipe part.

5 Claims, 5 Drawing Figures

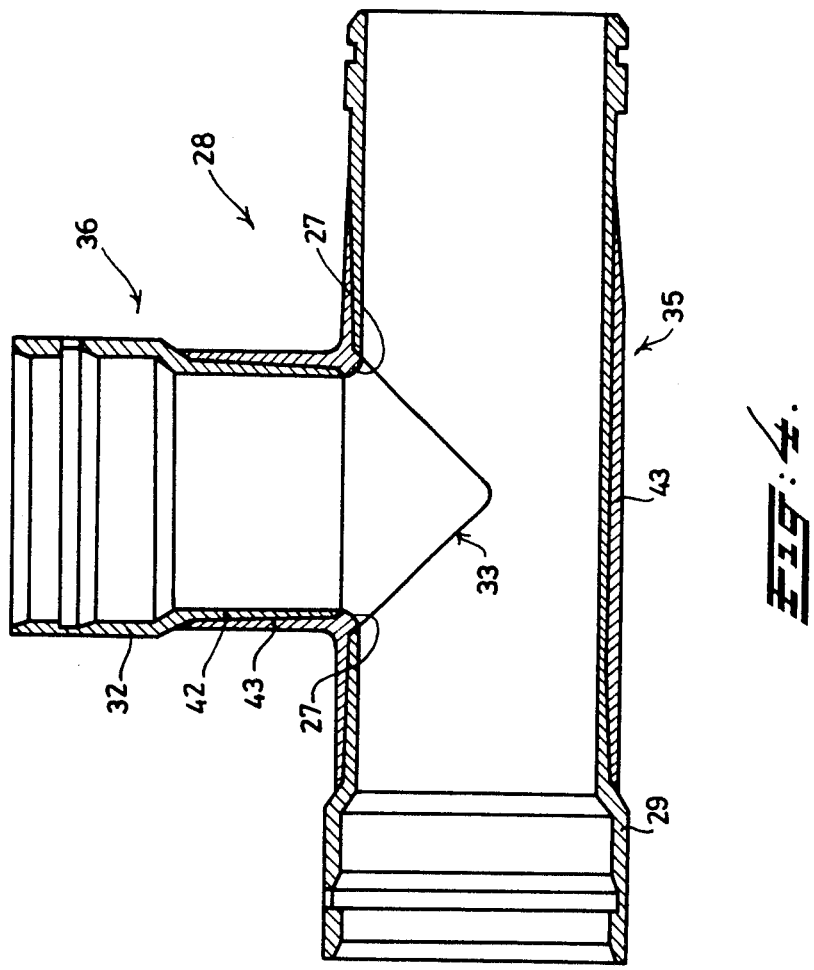

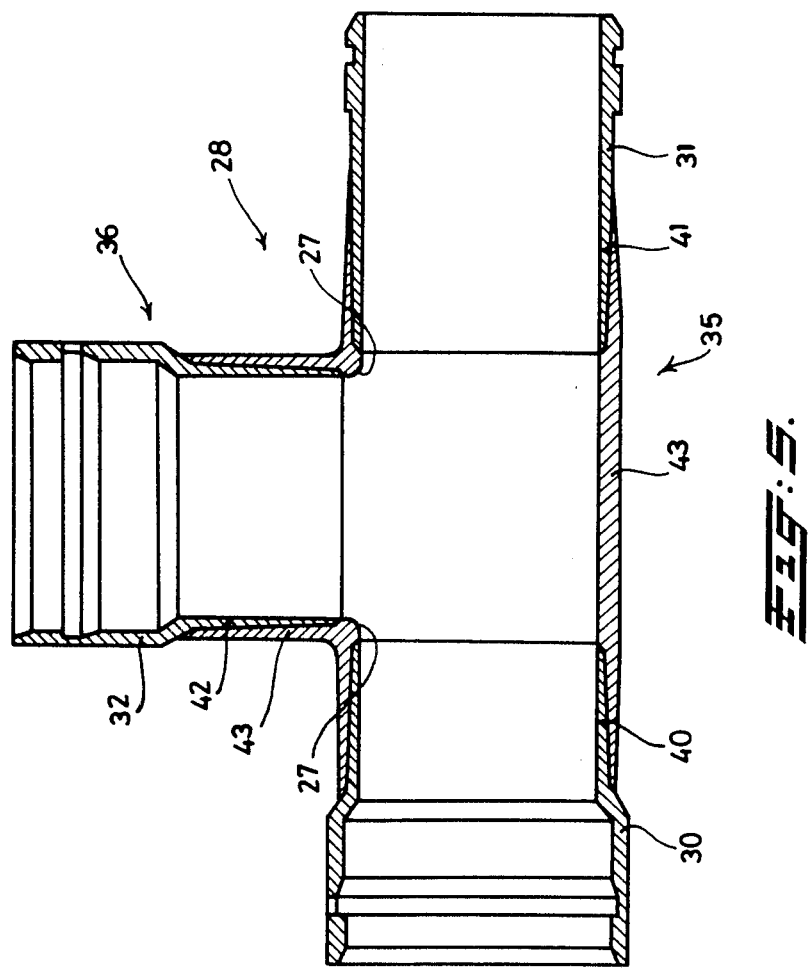

METHOD FOR MANUFACTURING A PIPE PART FROM FIBRE-REINFORCED THERMOSETTING SYNTHETIC MATERIAL

BACKGROUND OF THE INVENTION

The invention relates to a method for manufacturing a pipe part from fibre-reinforced thermosetting synthetic material comprising a main pipe part and at least one branch pipe part connected to it.

The invention also relates to a mandrel for manufacturing such pipe parts.

There are different methods known for manufacturing a pipe part of the above type such as a T-piece, from fibre-reinforced thermosetting material. In known method, synthetic resin impregnated fibres are applied to a steel mandrel defining the inside shape of a T-piece, preferably by winding and after the T-piece has reached the desired shape, the synthetic resin is cured, after which the steel mandrel consisting of several parts is removed from the T-piece. This method is mainly utilized in the manufacture of T-pieces having relatively small diameters up to about 300 mm. In the manufacture of T-pieces having a greater diameter, This method has the disadvantage that the mandrels are very expensive and that they are also extremely unwieldy. Furthermore, the time necessary for applying the resin impregnated fibres on the mandrel takes so long, that the resin applied first will cure prematurely, so that the manufacture of a T-piece of such dimensions would have to be carried out in several successive stages.

It is for this reason that in the production of large diameter T-pieces, a method is mostly utilized wherein a V-shaped opening is made in the wall of the main pipe part, into which a complementary V-shaped extremity of a branch pipe part is inserted. The space between the two pipe parts is then filled with a filling resin. In the area of the junction of the two pipe parts, resin impregnated fibres are wound around the T-pieces so formed, until a thickness has been reached corresponding to the required strength of the T-piece, after which it is cured. This method has a number of disadvantages. It is fairly difficult to achieve a precise fit between the two pipe parts, as both the V-shaped opening in the main pipe part and the V-shaped extremity in a branch pipe part have to be made by sawing. That is the reason why a filling resin is mostly used when assembling both pipe parts into a T-piece. Furthermore, with this method it is not possible to achieve a smooth transition between the main and the branch pipe parts. In the case of extremely large T-pieces, where the T-piece is internally accessible for a person, this transition may be improved subsequently, but in the case of T-pieces with a diameter of about 500 mm., this is impossible.

Finally, T-pieces manufactured in this way may only be loaded upto a limited internal pressure, which is too low for pipe systems intended for high pressure applications.

SUMMARY OF THE INVENTION

It is an object of this invention to provide a method in which the abovementioned disadvantages are eliminated.

This objective is accomplished according to the invention, by a method of the abovementioned type, which is characterized in that pre-formed pipe parts made of fibre-reinforced thermosetting synthetic material are placed on at least a part of the mandrel defining the inside shape of the pipe part, the external surface of the mandrel being partially covered and synthetic resin impregnated fibres are applied to the part of the mandrel not covered by pre-formed pipe parts and to at least the adjacent parts of the pre-formed pipe parts placed on the mandrel, until the pipe part has reached the desired final shape, after which it is cured and the mandrel is removed from the finished pipe part.

With this method, pipe parts, especially T-pieces having a relatively large diameter, can be manufactured in a relatively short time and pipe parts can be obtained which are rounded off at the transition from the main to the branch pipe part.

Preferably, the parts of the pre-formed pipe parts adjacent to the part of the mandrel not covered by the pre-formed pipe parts are chamfered on the outside. This will result in a very gradual transition between the pre-formed pipe parts and the part of the pipe part applied later, which will enhance the strength of the total product. The angle between the outside and the inside of the pre-formed pipe parts in the region of the chamfered parts, is, for example, less than 10°.

It is advantageous to seal the space between the core and the inside of the pre-formed pipe parts, preferably by means of expandible elements, made of elastic material, such as rubber. This prevents the penetration of liquid synthetic resin into the space between the mandrel and the pre-formed pipe parts on the mandrel, during the application of resin impregnated fibres, which may result in irregularities of the internal surface of the finished product.

The invention also relates to a mandrel for manufacturing pipe parts from fibre-reinforced thermosetting synthetic material, comprising a main pipe part and at least one branch part connected to it, which is characterized in that the mandrel comprises at least one main part for forming the main pipe part and at least one removable side part transversely connected to it, for forming the branch pipe part, said parts being adapted to receive the pre-formed pipe parts thereon.

It is advantageous to provide the mandrel with means for sealing the space between the mandrel and the inside of the pre-formed pipe parts placed on the mandrel, which means preferably consist of radially expandible elements made of elastic material, such as rubber.

In a preferred embodiment, the main part of the mandrel comprises a cylindrical body made of elastic material, such as rubber, which is provided at both end faces with rigid round disks which can be moved towards each other by means of pulling rods extending through the cylindrical body while increasing the outide circumference of the cylindrical body and the side part of the mandrel is provided with an annular groove in the outside surface, in which is fitted a groove filling annular body made of elastic material, such as rubber and means are available for increasing the outer circumference of the annular body.

By moving the rigid round disks towards each other, the length of the cylindrical main part of the mandrel will be somewhat reduced and its outer circumference will be increased. This will result in the outside of the cylindrical main part being pressed against the inside of the pre-formed pipe parts placed on this main part, so that a good seal is achieved between the main part and the pipe parts placed on it.

By increasing the outer circumference of the annular body fitted in the groove of the side part of the mandrel, a good seal is achieved between this side part and the pre-formed pipe part placed on it.

The invention finally relates to a pipe part made of fibre-reinforced thermosetting synthetic material, comprising a main pipe part and at least one branch pipe part connected to it and made up from pre-formed pipe parts made of fibre-reinforced thermosetting synthetic material, which are connected to each other by means of a connecting part made of fibre-reinforced thermosetting synthetic material which is at least partly applied around the pre-formed pipe parts characterized in that on the inside of the pipe part the transition between the wall of the main pipe part and the wall of the branch pipe part is rounded off.

BRIEF DESCRIPTION OF THE DRAWING

The invention will be explained hereafter by means of the description of a practical embodiment with reference to the drawing, wherein:

FIG. 4 is a schematic section of a T-piece manufactured with the method according to the invention;

FIG. 5 is a schematic section of a second embodiment of a T-piece manufactured with the method according to the invention.

DESCRIPTION OF THE PREFERRED EMBODIMENT

Figure 1:
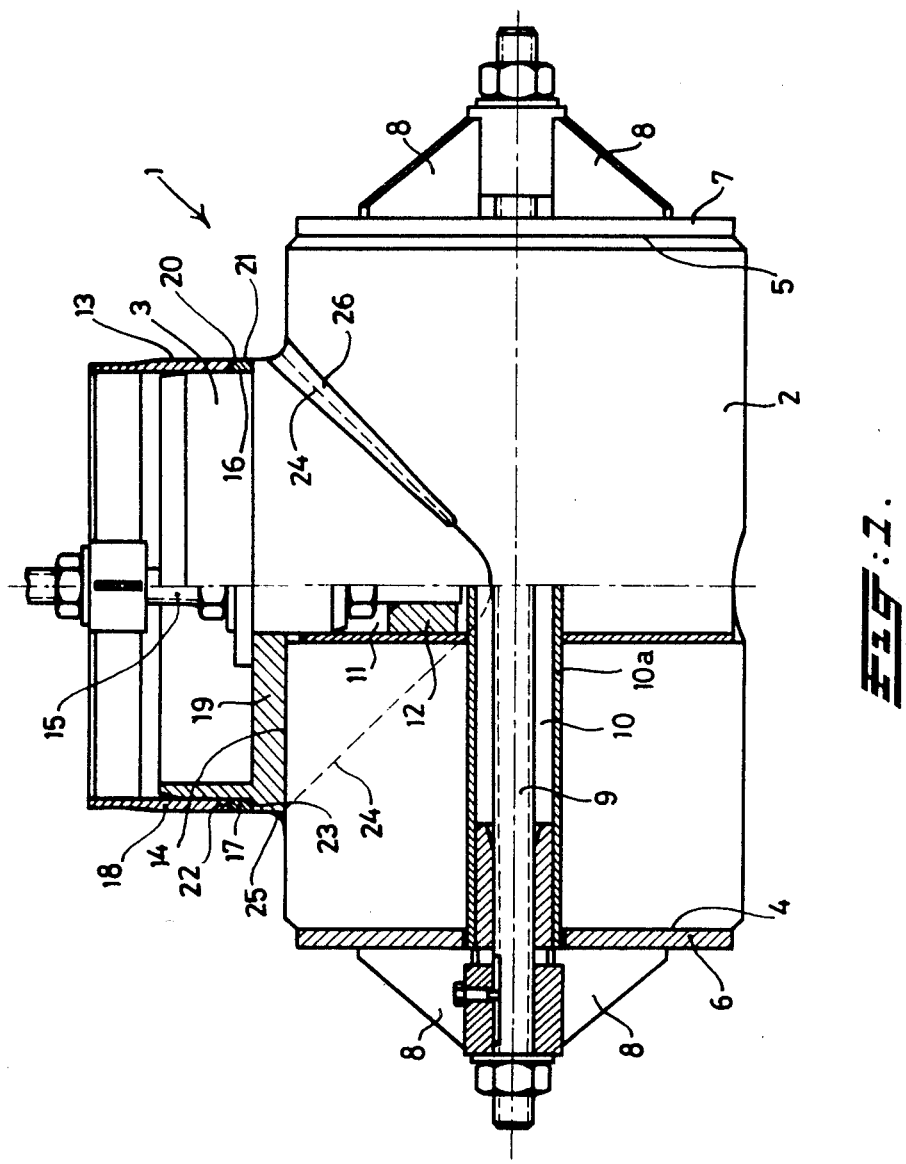
FIG. 1 is a representation of a mandrel according to the invention, shown partly in view and partly in section.

FIG. 1 is a representation of a mandrel 1 according to the invention, which comprises a substantially cylindrical main part 2 and a side part 3 transversely connected to it. The main part consists of elastic material, such as rubber, and is provided at both end faces 4, 5, with round disks 6, 7. The disks are provided with stiffening ribs 8, at right angles to their surfaces, which ensure that the disks can hardly bend. In order to displace the disks towards each other, they are connected by means of a threaded pulling rod 9, which extends through a hole 10, along the axis of the main part.

A rigid close-fitting tube 10a is inserted into the hole 10. In a second hole 11 and extending substantially at right angles to the abovementioned hole 10, through the main part 2, means 12 are incorporated to which the side part 3 can be fixed. This side part 3 consists of a substantially cylindrical outer surface 13 and has at one of the end faces 14 a hollow end-surface, which fits on the cylindrical main part 2 of the mandrel 1. By means of a second pulling rod 15, this side part can be fixed to this main part through the fixing means 12 in the second hole 11 in the main part 2. The side part 3 is provided in its outer surface with an annular groove 16, in which an annular body 17, made of elastic material such as rubber, is fitted.

In the embodiment shown, the side part 3 consists of two parts 18 and 19, capable of relative axial movement and the side walls 20, 21 of the groove 16 are formed by the end walls 22, 23 of these parts, so that the axial length of the groove can be varied.

In the transition area 24 between the main part 2 and the side part 3, strip-shaped parts are incorporated which ensure that the transition 27 between the main pipe part 35 and the branch pipe part 36 of the T-piece to be formed, is rounded off.

Figure 2:
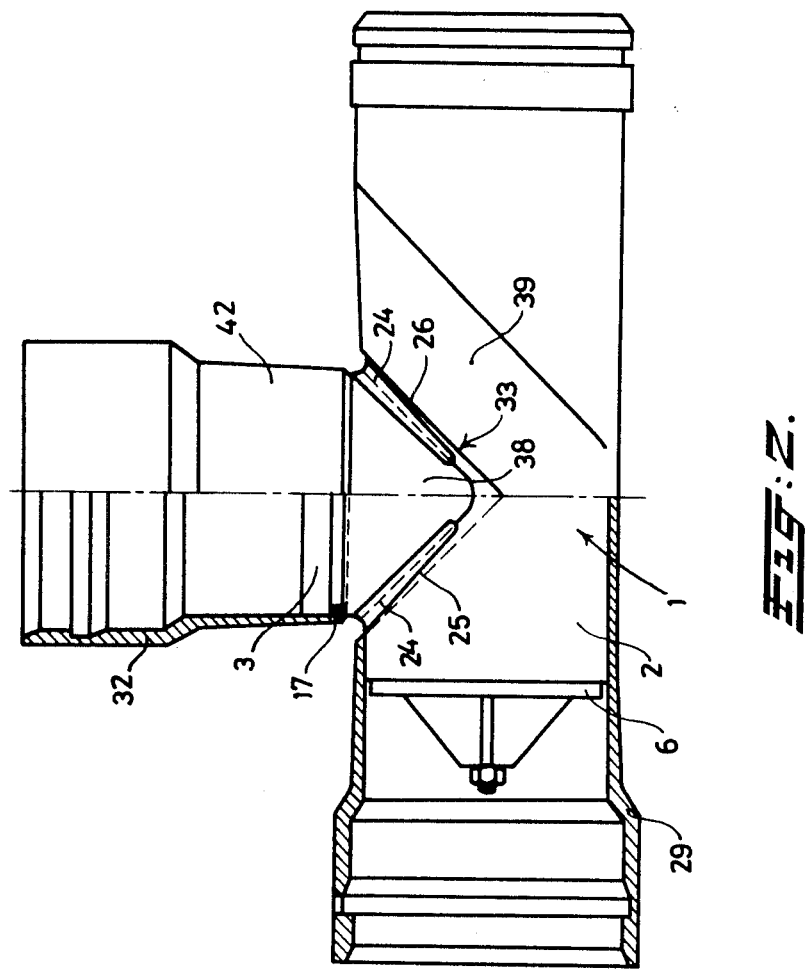
FIG. 2 is a schematic representation of the mandrel shown in FIG. 1 with the pre-formed pipe parts placed on it, shown partly in view and partly in section.
Figure 3:
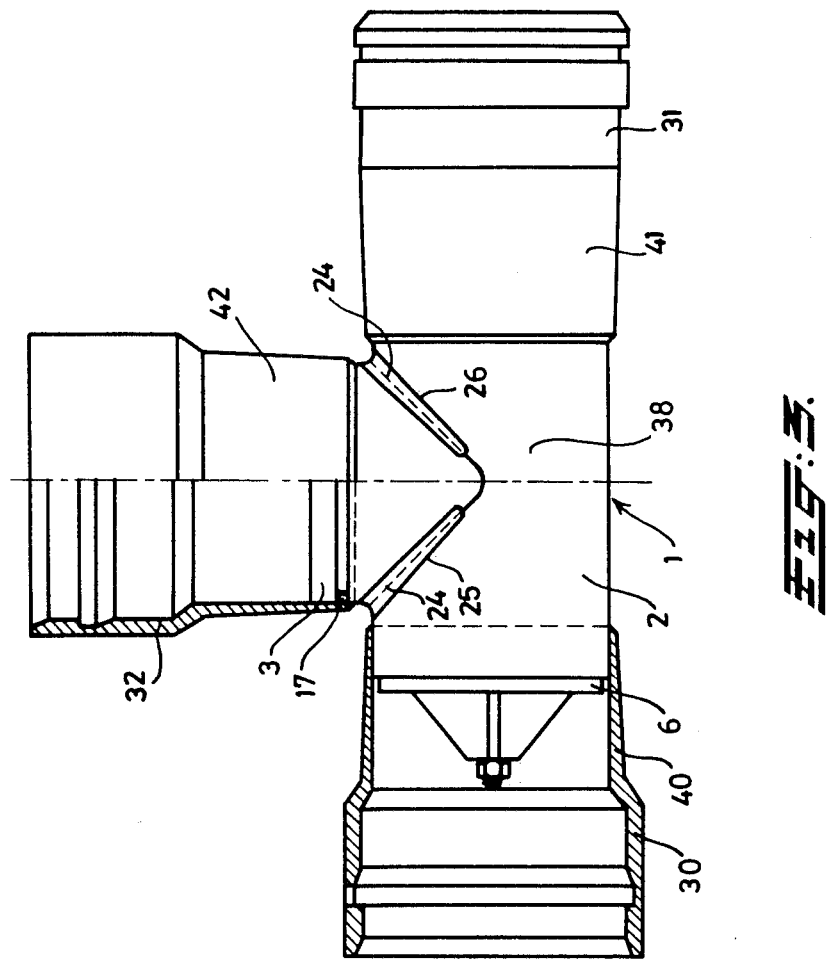
FIG. 3 is the same representation as FIG. 2 with a second embodiment of the pre-formed pipe parts.

In the manufacture of a T-piece 28, one proceeds as follows. Pre-formed pipe parts 29, 32; 30, 31, 32 made of fibre-reinforced thermosetting synthetic material are placed on the mandrel of FIG. 1 whereby the external surface of the mandrel is partially covered. The placement of the pre-formed pipe parts on the mandrel may be carried out in various ways. It is possible to place on the main part 2, to which the side part 3 is not yet fixed, one single pre-formed main pipe part 29 which is provided with a v-shaped opening 33, in the region of the connection with the branch pipe part 36 of the T-piece to be fixed later and then to fix the side part 3 of the mandrel to the main part 2 at the place of the V-shaped opening 33 and thereafter to place a second pre-formed pipe part 32 on this side part 32 (FIG. 2). It is also possible to place three separate pre-formed pipe parts 30, 31, 32 on the fully assembled mandrel 1 (FIG. 3).

After the pre-formed pipe parts (29, 32; 30, 31, 32) have been placed on the mandrel, the round disks 6, 7 on the end faces 4, 5 of the main part 2 are pulled towards each other by means of the pulling rod 9, whereby the length of the main part consisting of elastic material is somewhat reduced. As rubber is a non-compressible material and the main part 2 is supported by the rigid pipe 10a in the hole 9, the outer circumference of the main part is increased. In this way the external surface of the main part is pressed against the inside surface of the pre-formed pipe part 29 or the pipe parts 30, 31 placed on this main part so that the space between the pre-formed pipe part or the pre-formed pipe parts and the main part 2 of the mandrel 1 is sealed. Thereafter, the axial length of the annular body 17 in the groove 16 is reduced by the relative movement of the two parts 18, 19 of the side part 3 of the mandrel with the result that the outer circumference is increased, so that the external surface of the annular body 17 is pressed against the inside surface of the pre-formed pipe part 32 which is fixed to the side part 3 and a good seal between the pre-formed pipe part 32 and the side part 3 is realized.

In order to achieve a rounding off at the transition area 27 between the main pipe part 35 and the branch pipe part 36 of the T-piece 28, strip-shaped parts 25, 26 are incorporated at the transition area 24 between the main part 2 and the side part 3.

On the part 38 of the mandrel 1 not covered by the pre-formed pipe parts 29, 32; 30, 31, 32 and at least on the adjacent parts 39, 42; 40, 41, 42 of the pipe parts 29, 32; 30, 31, 32 respectively, placed on the mandrel synthetic resin impregnated fibres 43 are then applied at least by winding, until the T-piece has reached the desired final shape. It is then cured and finally the mandrel is removed from the finished T-piece.

The parts 39, 42; 40, 41, 42 of the pre-formed pipe parts adjacent to the part 38 of the mandrel 1 not covered by the pre-formed pipe parts 29, 32; 30, 31, 32 should preferably be chamfered on the outside, the angle between the outside and the inside of the pre-formed pipe parts at the region of the chamfering being less than 30° and preferably less than 10°.

As a result of this, an excellent bonding is obtained between the pre-formed pipe parts 29, 32; 30, 31, 32 and the part 43 which is applied afterwards.

Pipe parts obtained by utilizing the method according to the invention, display excellent qualities of strength and are very suitable for use in high pressure pipe lines.

Tests have revealed that the yield pressure of a T-piece manufactured according to the invention, is about one and a half times greater than that of a similar T-piece manufactured from pre-formed pipe parts according to the conventional method, wherein a branch pipe part with a V-shaped extremity is introduced into a main pipe part provided with a V-shaped opening.

In the example, the manufacture of a T-piece is described, although utilizing the method according to the invention will enable other pipe parts to be manufactured, such as pipe parts with more branch pipe parts or pipe parts with branch pipe parts which are not at right angles to the main pipe part.

What is claimed is:

1. The method for manufacturing a pipe part from fibre-reinforced thermosetting synthetic material comprising a main pipe part and at least one containing branch pipe part connected to it, which method comprises placing pre-formed pipe parts made of fibre-reinforced thermosetting synthetic material on at least one part of a mandrel defining the inside shape of the pipe part, thereby partially covering the external surface of the mandrel, applying synthetic resin impregnated fibres to the part of the mandrel not covered by the pre-formed pipe parts and to at least the adjacent parts of the pre-formed pipe parts placed on the mandrel until the pipe part has reached the desired final shape, curing the pipe part and removing the mandrel from the finished pipe part.

2. The method according to claim 1, wherein the parts of the pre-formed pipe parts adjacent to the part of the mandrel not covered by the pre-formed pipe parts are chamfered on the outside, the angle between the outside and the inside of the pre-formed pipe parts in the region of the chamfered parts being less than 30°.

3. The method according to claim 2, wherein the angle between the outside and the inside of the pre-formed pipe parts in the region of the chamfered parts is less than 10°.

4. The method according to claim 2, wherein the angle between the outside and the inside of the pre-formed pipe parts in the region of the chamfered parts is less than 5°.

5. The method according to claim 1, wherein the space between the mandrel and the inside of the pre-formed pipe parts is sealed by means of radially expandable elements made of elastic material, such as rubber.

* * * * *